UNITED STATES PATENT OFFICE 2,214,278

BASIC METHYL MERCURY NITRATE

Heinrich Klös, Wuppertal-Elberfeld, Germany, assignor to Winthrop Chemical Company, Inc., New York, N. Y., a corporation of New York No Drawing. Application March 17, 1938, Serial No. 196,476. In Germany March 17, 1937

6 Claims. (Cl. 167—38)

The present invention relates to the manufacture of basic methyl mercury nitrate.

Methyl mercury nitrate ($CH_3.Hg.NO_3$) is described in literature as an oily or very difficultly crystallizing substance which deliquesces in the air and which cannot be recrystallized from a solvent.

In accordance with the present invention it has been established that by converting the methyl mercury nitrate into the basic methyl mercury nitrate a substance is obtained which can be more easily crystallised, which is stable in the air and less volatile than methyl mercury nitrate. Owing to this fact the handling of the new substance and its division into standardised quantities in the dry state is simpler than when the methyl mercury nitrate known in literature is employed. The mercury content of the basic nitrate is considerably higher than the mercury content of the nitrate which is stoichiometrically composed.

The preparation of the new compounds is effected by causing methyl mercury oxide or hydroxide to react with a quantity of nitric acid smaller than that required for the formation of methyl mercury nitrate of the formula $CH_3.Hg.NO_3$, or by causing methyl mercury nitrate ($CH_3.Hg.NO_3$) to react with methyl mercury hydroxide or methyl mercury oxide.

The quantities of the reactants are preferably so chosen that they correspond approximately to the quantities stoichiometrically required for forming basic methyl mercury nitrate.

The reaction is preferably carried out in the presence of a solvent, particularly water. If the final product is intended to be used as a dry seed grain disinfectant the reaction may also be performed in the presence of the required filler.

The new compound may be employed as an intermediate product, as a disinfecting agent, for instance for surgical instruments, for the conservation of wood and especially as a seed grain disinfectant. For these purposes the product is preferably used in admixture with a carrier such as a solvent or an inert filler. As solvents there come into consideration particularly water and aqueous alcohols. Suitable inert fillers are for instance kaolin, talc, chalk, gypsum, wood-flour, naphthol pitch sulfonate. Also adsorbents or absorbents such as silica gel, active charcoal or aluminum hydroxide may be added to improve the ratio between dosis curativa and dosis toxica. Furthermore, the basic methyl mercury nitrate may be employed in conjunction with other fungicidal or bactericidal agents such for instance as methoxyethyl mercury salts or hydroxy phenyl hydrazines.

As seed grain disinfectant the basic mercury hydroxide is advantageously used in the dry state, i. e., in admixture with solid fillers.

The invention is further illustrated by the following examples, the parts, if not otherwise indicated, being by weight:

Example 1

2-N-nitric acid is added to a solution of 23.2 parts of methyl mercury hydroxide in 60 parts of water at room temperature while vigorously stirring, until the reaction is clearly acid to Congo red. To reach this about 25 parts by volume of the acid are necessary whilst the quantity necessary for the formation of the compound of the formula $CH_3.Hg.NO_3$ from the same quantity of methyl mercury hydroxide would amount to 50 parts by volume of this acid. A precipitate is at once formed which after filtering with suction is recrystallized in a small quantity of water, and dried at 80°–100° C., if desired under reduced pressure. The new compound obtained is faintly yellow crystalline power which dissolves in water whilst displaying an acid reaction. Compared with most of the known methyl mercury compounds its odour is far less intense. In the new compound the mercury atom is very strongly linked and may be transformed into the ionised state only by boiling, for instance with aqua regia.

There is no stoichiometrical relationship between the quantities of methyl mercury nitrate and methyl mercury hydroxide or oxide in the new compound. The mercury content of the product obtainable according to the method described is higher than 80% whilst methyl mercury nitrate of the formula $CH_3.Hg.NO_3$ contains only 72.0% of mercury.

When heating the substance in a capillary tube it remains unchanged up to temperatures of 166° C.; on further heating it begins to change its colour and to melt with decomposition.

For disinfecting purposes and for the conservation of wood the compound obtained can be used in the form of an aqueous solution.

It may further be admixed to inert fillers such as kaolin or chalk to which, if desired, dust-binding agents and adsorbents such as silica gel or charcoal have been added, so that the mercury content of the final preparation amounts to about 1%. Such preparations can be employed as highly efficacious dry seed grain disinfectants.

Example 2

To a solution of 27.7 parts of methyl mercury nitrate ($CH_3.Hg.NO_3$) (prepared according to the method of Slotta, Journal für praktische Chemie (2), volume 120, page 297) in 50 parts of water, a solution of 25 parts of methyl mercury hydroxide in 60 parts of water is added while stirring. Basic methyl mercury nitrate separates displaying the same properties as the product described in Example 1. The product may be worked up and used as described in the foregoing example.

I claim:

1. Basic methyl mercury nitrate being a faintly yellow crystalline substance which is soluble in water while displaying an acid reaction, stable to the influence of air, and having a mercury content of more than 80%.

2. Bactericidal and fungicidal agent comprising as its active ingredient basic methyl mercury nitrate being a faintly yellow crystalline substance which is soluble in water while displaying an acid reaction, stable to the influence of air, and having a mercury content of more than 80%.

3. Dry seed grain disinfectant comprising basic methyl mercury nitrate being a faintly yellow crystalline substance which is soluble in water while displaying an acid reaction, stable to the influence of air, and having a mercury content of more than 80% in admixture with a solid filler.

4. Dry seed grain disinfectant comprising basic methyl mercury nitrate being a faintly yellow crystalline substance which is soluble in water while displaying an acid reaction, stable to the influence of air, and having a mercury content of more than 80% in admixture with such quantities of the solid filler that the mercury content of the final preparation amounts to about 1%.

5. The process for the manufacture of basic methyl mercury nitrate being a faintly yellow crystalline substance which is soluble in water while displaying an acid reaction, stable to the influence of air, and having a mercury content of more than 80%, comprising reacting methyl mercury nitrate ($CH_3.Hg.NO_3$) with a methyl mercury compound selected from the group consisting of the hydroxide and oxide.

6. The process for the manufacture of basic methyl mercury nitrate being a faintly yellow crystalline substance which is soluble in water while displaying an acid reaction, stable to the influence of air, and having a mercury content of more than 80%, comprising reacting a methyl mercury compound selected from the group consisting of hydroxide and oxide with a quantity of nitric acid smaller than that required for the formation of methyl mercury nitrate of the formula $CH_3.Hg.NO_3$.

HEINRICH KLÖS.